United States Patent
Ishibashi

(10) Patent No.: US 11,345,239 B2
(45) Date of Patent: May 31, 2022

(54) POWER SUPPLY SYSTEM

(71) Applicant: YAZAKI CORPORATION, Tokyo (JP)

(72) Inventor: Shuichi Ishibashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/557,975

(22) Filed: Aug. 30, 2019

(65) Prior Publication Data

US 2019/0381888 A1   Dec. 19, 2019

Related U.S. Application Data

(63) Continuation of application No. PCT/JP2017/013964, filed on Apr. 3, 2017.

(51) Int. Cl.
| | | |
|---|---|---|
| *B60L 1/16* | (2006.01) | |
| *B60Q 3/74* | (2017.01) | |
| *B60L 1/04* | (2006.01) | |

(52) U.S. Cl.
CPC ........ *B60L 1/16* (2013.01); *B60L 1/04* (2013.01); *B60Q 3/74* (2017.02); *B60L 2210/10* (2013.01)

(58) Field of Classification Search
CPC ........................................................ B60L 1/16
See application file for complete search history.

(56) References Cited

U.S. PATENT DOCUMENTS

| | | |
|---|---|---|
| 5,825,096 A | 10/1998 | Morimoto et al. |
| 2001/0005083 A1 | 6/2001 | Serizawa et al. |
| 2001/0007419 A1* | 7/2001 | Tanaka ............... H02J 7/1415 |
| | | 323/285 |
| 2003/0137285 A1* | 7/2003 | Tamai .................. H02J 9/005 |
| | | 323/266 |
| 2011/0231042 A1 | 9/2011 | Ueda et al. |
| 2018/0043849 A1* | 2/2018 | Ishibashi ............ B60R 16/0207 |

FOREIGN PATENT DOCUMENTS

| | | |
|---|---|---|
| JP | 9-189160 A | 7/1997 |
| JP | 10-217876 A | 8/1998 |
| JP | 2001-171430 A | 6/2001 |
| JP | 2004-112934 A | 4/2004 |
| JP | 2007-230264 A | 9/2007 |
| JP | 2014-97726 A | 5/2014 |
| WO | 02/062623 A2 | 8/2002 |

OTHER PUBLICATIONS

International Search Report and Written Opinion of the International Search Report for PCT/JP2017/013964 dated Jun. 27, 2017.

* cited by examiner

*Primary Examiner* — Daniel Kessie

(74) *Attorney, Agent, or Firm* — Kenealy Vaidya LLP

(57) ABSTRACT

A power supply system includes a battery disposed on a vehicle lower portion; a feeder line electrically coupled to the battery, wired inside a hollow front pillar that couples a vehicle upper portion with the vehicle lower portion, and configured to supply electric power from the battery to the vehicle upper portion; and a power distributor disposed on the vehicle upper portion, electrically coupled to the feeder line, and configured to distribute the electric power that is input from the feeder line to load devices disposed on a vehicle. As a result, the power supply system can improve the workability of wiring work.

4 Claims, 2 Drawing Sheets

POWER SUPPLY SYSTEM

CROSS-REFERENCE TO RELATED APPLICATION

This application is a continuation application of International Application PCT/JP2017/013964, filed on Apr. 3, 2017 and designating the U.S., the entire contents of which are incorporated herein by reference.

BACKGROUND OF THE INVENTION

1. Field of the Invention

The present invention relates to a power supply system.

2. Description of the Related Art

Conventionally, a technology that arranges, in a vehicle such as an automobile, electrical components (load devices), such as a room lamp and a receiver of a panel switch, on a ceiling of a vehicle interior has been known (for example, Japanese Patent Application Laid-open No. H09-189160). In this technology, a receiving unit of the receiver of the panel switch and a controller thereof are built into the inside of the room lamp. A bulb and the receiver are powered from a feeder line that is coupled to a battery. This feeder line is wired to the room lamp from the battery through the inside of a pillar.

Incidentally, when the number of electrical components arranged on the ceiling of the vehicle interior increases, the number of feeder lines wired inside the pillar increases. As a result, the wiring of the feeder lines inside the pillar becomes complicated, and the wiring work of the feeder lines needs time and effort. As just described, in the power supply to the electrical components arranged on the ceiling of the vehicle interior, there is room for improvement in that the wiring of the feeder lines is simplified and in that the workability of the wiring work of the feeder lines is improved.

SUMMARY OF THE INVENTION

Thus, an object of the present invention is to provide a power supply system capable of improving the workability of the wiring work of the feeder lines.

In order to solve the above mentioned problem and achieve the object, a power supply system according to one aspect of the present invention includes a power supply device disposed on a vehicle lower portion of a vehicle; a power line electrically coupled to the power supply device, wired inside a hollow coupling member that couples a vehicle upper portion of the vehicle with the vehicle lower portion thereof, and configured to supply electric power from the power supply device to the vehicle upper portion; and a power distributor electrically coupled to the power line, and configured to distribute electric power input from the power line to a first load device, a first voltage converter electrically coupled to the power line and configured to convert voltage of the electric power that is input from the power line, and a overhead console disposed on the vehicle upper portion and on the front side in an advancing direction of the vehicle, wherein the coupling member is a front pillar disposed on the front side in the advancing direction, the overhead console accommodates the first load device, the first voltage converter and the power distributor.

According to another aspect of the present invention, in the power supply system, it is preferable that a second voltage converter accommodated in the overhead console, electrically coupled to the power line, and configured to convert voltage of the electric power that is input from the power line, wherein the power distributor is electrically coupled to each of the first voltage converter and the second voltage converter and configured to distribute electric power to each of the first voltage converter and the second voltage converter, the electric power converted by the first voltage converter is supplied to the first load device, the electric power converted by the second voltage converter is supplied to the second load device which is disposed on the vehicle upper portion.

According to still another aspect of the present invention, in the power supply system, it is preferable that the first voltage converter generates an illumination power supply, the second voltage converter generates a key-switch power supply.

According to still another aspect of the present invention, in the power supply system, it is preferable that the electric power converted by the first voltage converter is supplied to the second load device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an exemplary embodiment of a power supply system according to the present invention in detail with reference to the accompanying drawings. The invention, however, is not intended to be limited by the embodiment. The constituent elements in the following embodiment include elements that are substitutable and easily achieved by a person skilled in the art, or elements that are substantially the same as the constituent elements.

Embodiment

Figure 1:
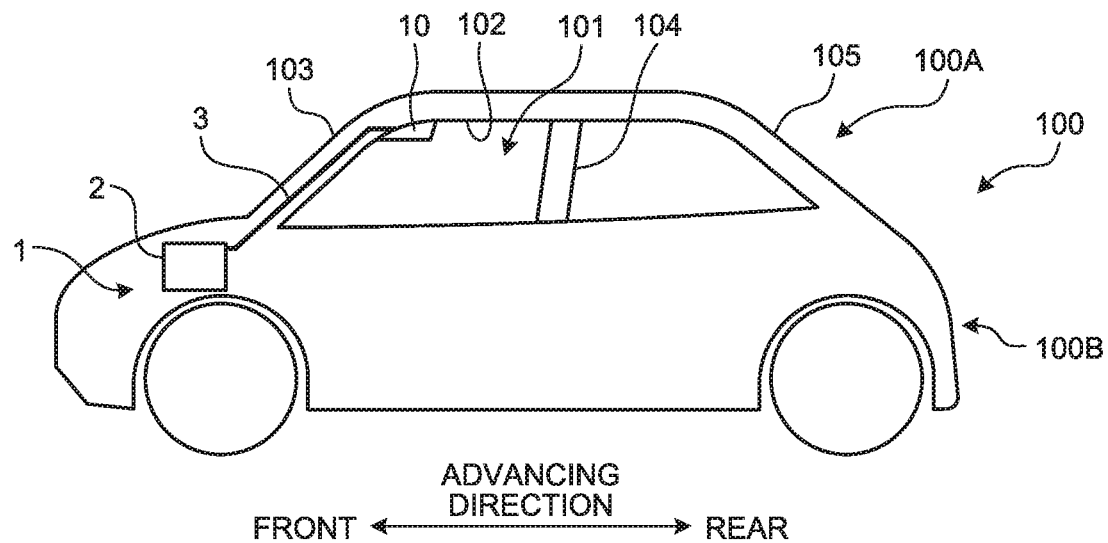
FIG. 1 is a schematic diagram for explaining a power supply system according to an embodiment of the present invention.
Figure 2:
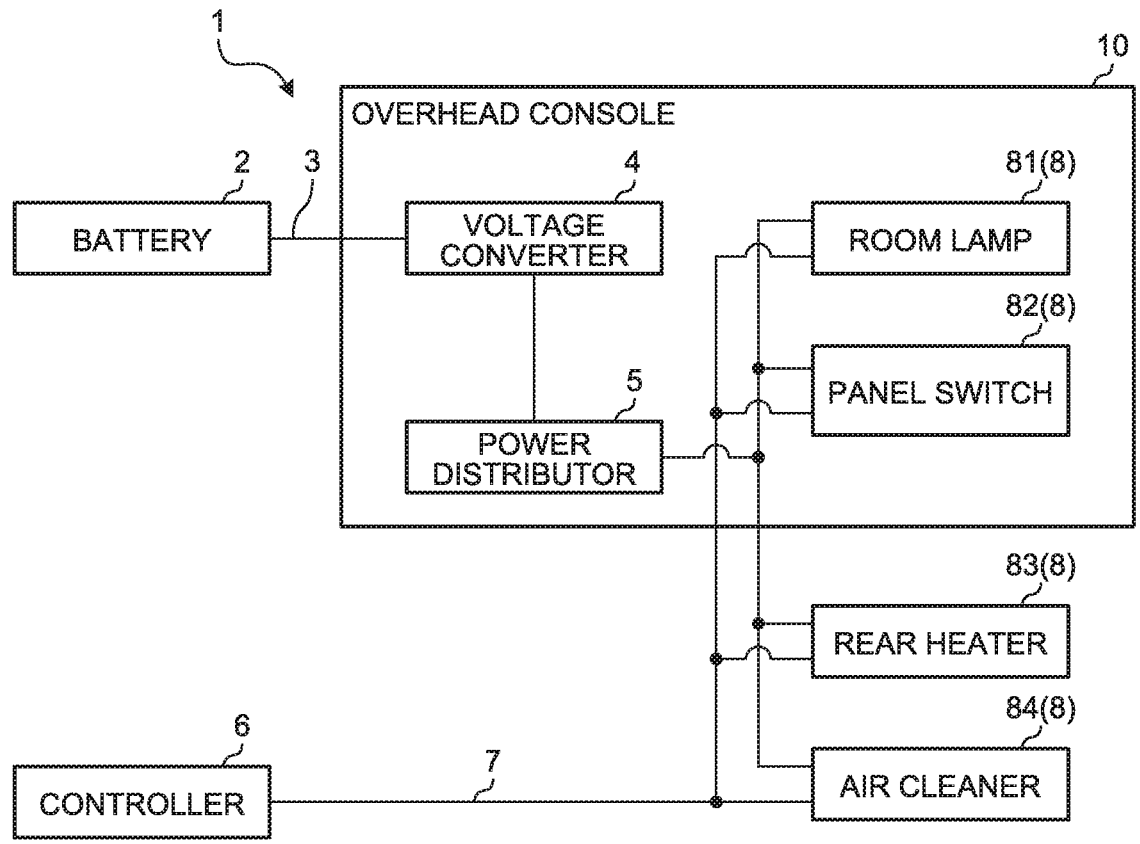
FIG. 2 is a schematic block diagram for explaining the power supply system in the embodiment of the present invention.
Figure 3:
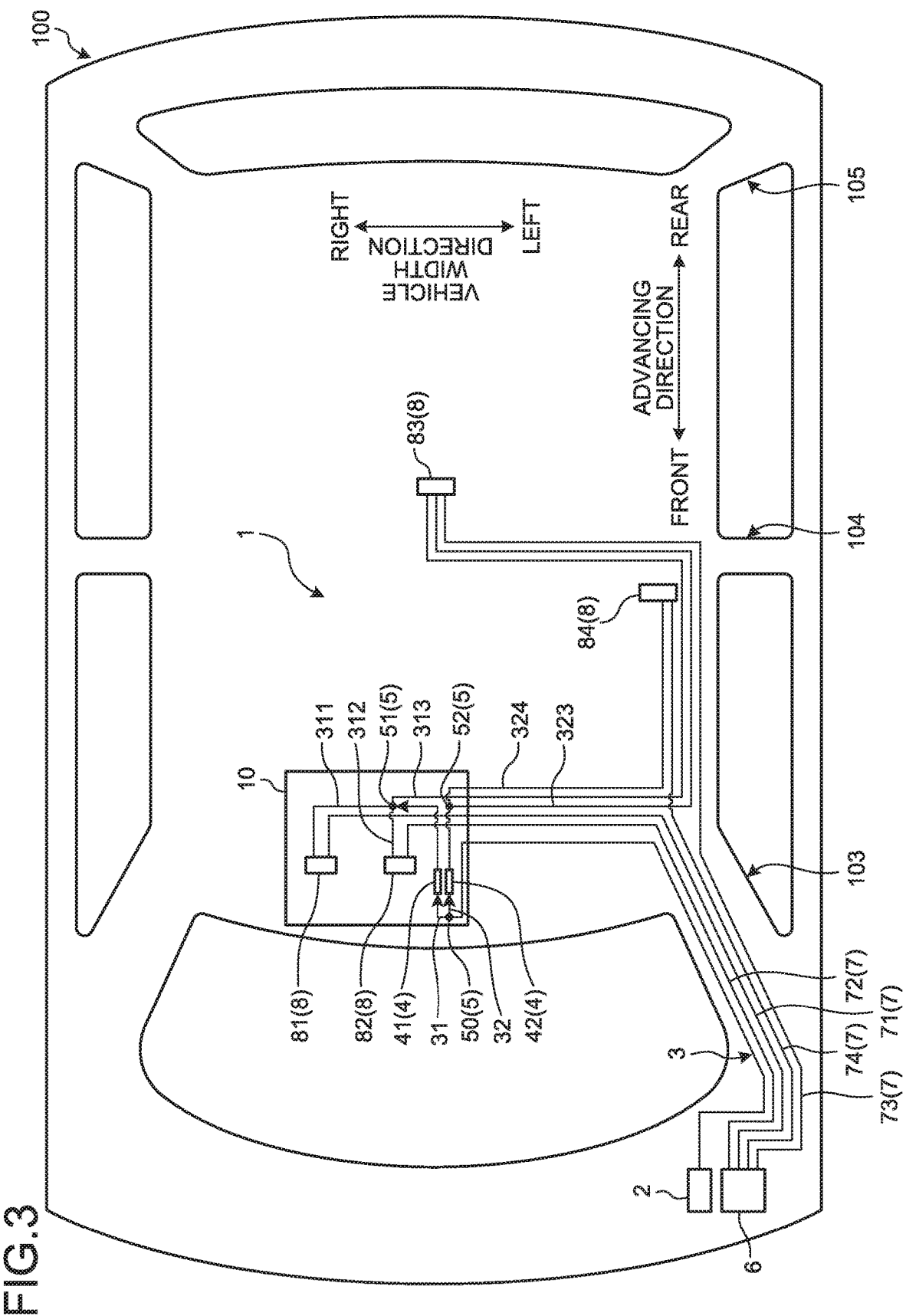
FIG. 3 is a schematic block diagram for explaining the power supply system in the embodiment of the present invention.

FIG. 1 is a schematic diagram for explaining a power supply system according to the embodiment of the present invention. FIG. 2 is a schematic block diagram for explaining the power supply system in the embodiment of the present invention. FIG. 3 is a schematic block diagram for explaining the power supply system in the embodiment of the present invention.

A power supply system 1 according to the present embodiment illustrated in FIG. 1 to FIG. 3 supplies, in a vehicle 100 such as an automobile, electric power to a plurality of load devices 8 arranged on a ceiling 102 in a vehicle interior 101. The ceiling 102 of the vehicle 100 is supported from below by a plurality of pillars (coupling members). The pillar is a hollow coupling member that couples a vehicle upper portion 100A with a vehicle lower portion 100B which will be described later. In the present embodiment, the ceiling 102 is supported by front pillars (coupling members) 103, center pillars (coupling members) 104, and rear pillars (coupling members) 105. The front pillars 103 are located on the front side in an advancing direction of the vehicle 100. That is, the front pillars 103 are located at end portions in a vehicle width direction of a windshield. The center pillars 104 are located at the center in the advancing direction of the vehicle 100. The rear pillars 105 are located on the rear side in the advancing direction of the vehicle 100. That is, the rear pillars 105 are located at end portions in the vehicle width direction of a rear windshield. The vehicle upper portion 100A is a portion located above the pillars 103, 104, and 105 in the vertical direction including the ceiling 102 and the vicinity of the ceiling 102. The vehicle lower portion 100B is a portion located below the pillars 103, 104, and 105 in the vertical direction including a floor surface, a space below the floor surface (not depicted), an engine room, a trunk room, and the like.

The power supply system 1 primarily includes a battery (power supply device) 2, a feeder line (power line) 3, a voltage converter 4, and a power distributor 5.

The battery 2 is mounted on the vehicle lower portion 100B. The battery 2 is a secondary battery capable of storing electric power. The battery 2 supplies the electric power to the load devices 8 which will be described later.

The feeder line 3 is wired from the battery 2 up to the ceiling 102 through the inside of the front pillar 103. The feeder line 3 electrically couples the battery 2 with the voltage converter 4 which will be described later. The feeder line 3 supplies the electric power output from the battery 2 to the voltage converter 4 at an as-is voltage. In the present embodiment, the feeder line 3 is made up of a single electric wire. The feeder line 3 branches into two electric wires 31 and 32 in a first power distributor 50 of an overhead console (housing) 10 which will be described later. The electric wire 31 is electrically coupled to a first voltage converter 41 which will be described later. The electric wire 31 branches into three electric wires 311, 312, and 313 in a second power distributor 51. The electric wires 311, 312, and 313 are electrically coupled to the respective load devices 8. The electric wire 32 is electrically coupled to a second voltage converter 42 which will be described later. The electric wire 32 branches into two electric wires 323 and 324 in a third power distributor 52. The electric wires 323 and 324 are electrically coupled to the respective load devices 8.

The voltage converter 4 has a function of generating the electric power for which the voltage of the electric power supplied via the feeder line 3 is lowered to, for example, 12 V in accordance with a drive voltage of the load devices 8 described later. The voltage converter 4 is electrically coupled to the electric wires 31 and 32 and the power distributor 5 which will be described later. In the present embodiment, the voltage converter 4 is mounted above the front pillar 103. As the voltage converter 4, the first voltage converter 41 and second voltage converter 42 are disposed. The first voltage converter 41 generates an illumination power supply. The illumination power supply supplies the electric power when a headlight switch of headlights is ON The first voltage converter 41 is electrically coupled with the electric wire 31. The second voltage converter 42 generates a key-switch power supply. The key-switch power supply supplies the electric power when a key switch is ON or at a start position. The second voltage converter 42 is electrically coupled with the electric wire 32.

The power distributor 5 distributes the electric power that is input from the feeder line 3 to the load devices 8 described later. In more detail, the power distributor 5 distributes and outputs the electric power depending on the number of the load devices 8. The power distributor 5 is mounted above the front pillar 103. The power distributor 5 is electrically coupled to the voltage converter 4 and the load devices 8 via the electric wires 31, 32, 311, 312, 313, 323, and 324. In the present embodiment, as the power distributor 5, the first power distributor 50, the second power distributor 51, and the third power distributor 52 are disposed. The first power distributor 50 distributes the electric power depending on the number of the voltage converters 4. In the present embodiment, the first power distributor 50 divides the feeder line 3 into the two electric wires 31 and 32. The second power distributor 51 distributes the electric power depending on the number of the load devices 8 to which the illumination power supply is supplied. In the present embodiment, the second power distributor 51 divides the electric wire 31 into the three electric wires 311, 312, and 313. The electric power distributed by the second power distributor 51 is supplied to each of the load devices 8 via the electric wires 311, 312, and 313 that are wired on the back of the ceiling 102. In the present embodiment, the second power distributor 51 distributes the electric power supplied to a room lamp 81, a panel switch 82, and a rear heater 83. The third power distributor 52 distributes the electric power depending on the number of the load devices 8 to which the key-switch power supply is supplied. In the present embodiment, the third power distributor 52 divides the electric wire 32 into the two electric wires 323 and 324. The electric power distributed by the third power distributor 52 is supplied to each of the load devices 8 via the electric wires 323 and 324 that are wired on the back of the ceiling 102. In the present embodiment, the third power distributor 52 distributes the electric power supplied to the rear heater 83 and an air cleaner 84. The number of the electric wires to branch into is not limited thereto, and is defined depending on the number of the load devices 8 to be coupled as appropriate.

A controller 6 has control of the load devices 8 described later. The controller 6 is mounted on the vehicle lower portion 100B. The controller 6 is electrically coupled to the load devices 8 via signal lines 7 which will be described later. The controller 6 outputs control signals to control the load devices 8.

The signal lines 7 are wired from the controller 6 up to the ceiling 102 through the inside of the front pillar 103. The signal line 7 is a transmission line that transmits the control signal output from the controller 6 to the load device 8. The signal line 7 electrically couples the controller 6 with the load device 8. In the present embodiment, the signal lines 7 are wired in the same number as the number of the load devices 8 to which the control signal is transmitted. In the present embodiment, four signal lines 71, 72, 73, and 74 are wired.

The load devices 8 are electrical components mounted on the ceiling 102. In the present embodiment, as the load devices 8, the room lamp 81, the panel switch 82, the rear heater 83, and the air cleaner 84 are disposed. The room lamp 81 is fitted to an overhead console 10 which will be described later. The room lamp 81 is a lighting fixture including an LED lighting fixture, for example. The room lamp 81 is turned on/off based on switch operation of the panel switch 82 described later. The room lamp 81 is driven based on the electric power supplied from the battery 2 via the electric wire 311, and the control signal input from the controller 6 via the signal line 71. The panel switch 82 is fitted to the overhead console 10 described later. The panel switch 82 is arranged with switches for performing various operations of the load devices 8. The panel switch 82 outputs a control signal via the signal line 7 not depicted to the load device 8 that is the subject of the switch operation. The panel switch 82 is driven based on the electric power supplied from the battery 2 via the electric wire 312, and the control signal input from the controller 6 via the signal line 72. The rear heater 83 is attached at the center of the vehicle interior 101 in the advancing direction and at the center of the ceiling 102 in the vehicle width direction. The rear heater 83 is a heater device for rear seats. The rear heater 83 is driven based on the electric power supplied from the battery 2 via the electric wires 313 and 323, and the control signal input from the controller 6 via the signal line 73. The air cleaner 84 is attached at the center of the vehicle interior 101 in the advancing direction and on the left side of the ceiling 102 in the vehicle width direction. The air cleaner 84 cleanses the air in the vehicle interior 101. The air cleaner 84 is driven based on the electric power supplied from the battery 2 via the electric wire 324, and the control signal input from the controller 6 via the signal line 74.

The overhead console 10 is fitted to the ceiling 102. The overhead console 10 has a relay connector (not depicted) arranged on the outer circumference. This relay connector electrically couples the feeder line, the electric wires, and the signal lines wired inside the overhead console 10 with the externally wired feeder line, the electric wires, and the signal lines. In more detail, the feeder line 3 is made up of, in the relay connector, a portion wired outside of the overhead console 10 and a portion wired inside of the overhead console 10 being electrically coupled, for example. In such an overhead console 10, a part of the feeder line 3, the electric wires 31, 32, 311, and 312, a part of the electric wires 313, 323, and 324, the voltage converter 4, the power distributor 5, the room lamp 81, and the panel switch 82 are attached. The overhead console 10 is attached on the front side of the ceiling 102 in the advancing direction and at the center in the vehicle width direction.

Next, a power supply method and operation in the power supply system 1 will be described.

The electric power output from the battery 2 is supplied to the overhead console 10 fitted to the ceiling 102 at an as-is voltage, via the feeder line 3 through the inside of the front pillar 103. Then, the electric power supplied to the overhead console 10 is distributed by the first power distributor 50 and is supplied to the voltage converter 4. In more detail, the first power distributor 50 divides the feeder line 3 into the electric wires 31 and 32, and distributes the electric power that is supplied to the first voltage converter 41 and the second voltage converter 42. Then, the electric power supplied to the voltage converter 4 is lowered to, for example, 12 V by the voltage converter 4 in accordance with the voltage of the load device 8. In more detail, a part of the electric power supplied to the voltage converter 4 is input to the first voltage converter 41 via the electric wire 31 and is converted into an illumination-power supply voltage. Furthermore, the remain of the electric power supplied to the voltage converter 4 is input to the second voltage converter 42 via the electric wire 32 and is converted into a key-switch power supply voltage. Then, the electric power for which the voltage has been lowered by the voltage converter 4 is supplied to the second power distributor 51 and the third power distributor 52. The electric power supplied to the second power distributor 51 and the third power distributor 52 is distributed by the second power distributor 51 and the third power distributor 52 and is output to the load devices 8. In more detail, the second power distributor 51 divides the electric wire 31 into the electric wires 311, 312, and 313, and distributes the electric power that is supplied to the room lamp 81, the panel switch 82, and the rear heater 83. Furthermore, the third power distributor 52 divides the electric wire 32 into the electric wires 323 and 324, and distributes the electric power that is supplied to the rear heater 83 and the air cleaner 84.

The control signals output from the controller 6 are output to the load devices 8 from the controller 6, via the signal lines 71, 72, 73, and 74 through the inside of the front pillar 103.

Thus, the load devices 8 are driven based on the supplied electric power and the input control signals.

According to the power supply system 1 in the foregoing, the electric power output from the battery 2 can be supplied to the overhead console 10 via a single feeder line 3 wired to the ceiling 102 through the inside of the front pillar 103. In the power supply system 1, the electric power can be distributed by the power distributor 5 in the overhead console 10 and be output to the load devices 8. As a result, the power supply system 1 only needs to wire a single feeder line 3 inside the front pillar 103, and the routing of the feeder line 3 in the front pillar 103 can be facilitated. Thus, the power supply system 1 can simplify the wiring of the feeder line 3, improve the workability of the wiring work, and reduce the time and effort needed for the wiring work.

According to this power supply system 1, fitted to the overhead console 10 are a part of the feeder line 3, the electric wires 31, 32, 311, and 312, a part of the electric wires 313, 323, and 324, the voltage converter 4, the power distributor 5, the room lamp 81, and the panel switch 82. That is, a part of the feeder line 3, the electric wires 31, 32, 311, and 312, a part of the electric wires 313, 323, and 324, the voltage converter 4, the power distributor 5, the room lamp 81, and the panel switch 82, which are arranged on the front side of the ceiling 102 in the advancing direction and at the center in the vehicle width direction, are assembled to and integrated with the overhead console 10. Thus, because the power supply system 1 can facilitate the routing of various devices and apparatuses mounted on the front side of the ceiling 102 in the advancing direction and at the center in the vehicle width direction and improve the workability of assembly work, the time and effort needed for the assembly work can be reduced. Furthermore, the electric wires 31, 32, 311, and 312 that electrically couple between the voltage converter 4 and the power distributor 5 and between the power distributor 5 and the room lamp 81 and the panel switch 82 can be wired in the overhead console 10. Thus, the power supply system 1 can simplify the wiring of the electric wires 31, 32, 311, and 312, improve the workability of the wiring work, and reduce the time and effort needed for the wiring work.

According to this power supply system 1, the feeder line 3 is wired inside the front pillar 103. This makes it possible to shorten the length of the feeder line 3 that supplies the electric power to the overhead console 10 that is arranged on the front side of the ceiling 102 in the advancing direction and at the center in the vehicle width direction. Furthermore, because the feeder line 3 branches in the overhead console 10, the number of the electric wires wired to the ceiling 102 including the feeder line 3 can be reduced. Thus, the power supply system 1 can simplify the wiring of the feeder line 3, improve the workability of the wiring work, and reduce the time and effort needed for the wiring work.

The above-described power supply system 1 according to the embodiment of the present invention is not limited to the above-described embodiment, and various modifications can be made within the scope stated in claims.

The feeder line 3 in the foregoing has been described to be wired through the inside of the front pillar 103, but the embodiment is not limited thereto and the feeder line 3 may be wired to the ceiling 102 through the center pillar 104 and the rear pillar 105. Furthermore, the overhead console 10 has been described to be attached on the front side of the ceiling 102 in the advancing direction and at the center in the vehicle width direction, but the embodiment is not limited to this location.

The feeder line 3 in the foregoing has been described to be made up of a single electric wire, but the number of electric wires is not limited thereto, and it only needs to be smaller than the number of the load devices 8, that is, the number of the electric wires distributed in the power distributor 5. Specifically, when eight load devices 8 are arranged, two feeder lines 3 may be distributed to four electric wires each in the power distributor 5, for example. In this case also, as compared with a case where the power distributor 5 is disposed on the vehicle lower portion 100B and where eight feeder lines 3 are wired through the inside of the front pillar 103, it is possible to reduce the number of the feeder lines 3 wired through the inside of the front pillar 103.

The voltage converter 4 in the foregoing has been described to be accommodated in the overhead console 10, but the embodiment is not limited thereto and the voltage converter 4 may be disposed on the vehicle lower portion 100B, for example. In this case, the voltage converter 4 is electrically coupled to the battery 2. The electric power for which the voltage is lowered by the voltage converter 4 is supplied to the power distributor 5 via a single feeder line 3 wired to the ceiling 102 through the inside of the front pillar 103. In this case also, as with the above-described embodiment of the present invention, the electric power can be distributed by the power distributor 5 in the overhead console 10 and be output to the load devices 8.

The load devices 8 in the foregoing have been exemplified as the room lamp 81, the panel switch 82, the rear heater 83, and the air cleaner 84, but the embodiment is not limited thereto, and they only need to be electrical components arranged on the ceiling 102 or on the vehicle upper portion 100A near the ceiling 102.

The controller 6 in the foregoing has been described as to be mounted on the vehicle lower portion 100B, but the embodiment is not limited thereto and the controller 6 may be accommodated in the overhead console 10.

The voltage converter 4 and the power distributor 5 in the foregoing have been described as independent devices and apparatuses, but they may be implemented on a single power supply device including an intelligent power switch (IPS), for example.

The voltage converter 4 in the foregoing has been described as to convert the voltage into the illumination-power supply voltage by the first voltage converter 41 and to convert it into the key-switch power supply voltage by the second voltage converter 42, but the embodiment is not limited thereto and the voltage converter 4 may further convert it into an accessory-power supply voltage and a constant-power supply voltage, for example. The accessory-power supply supplies the electric power when the key switch is at an accessory position. The constant power supply supplies the electric power even when the key switch is Off.

The power supply system according to the present embodiment has an effect in that the workability of the wiring work can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply system comprising:
   a power supply device disposed on a vehicle lower portion of a vehicle;
   a power line electrically coupled to the power supply device, wired inside a hollow coupling member that couples a vehicle upper portion of the vehicle with the vehicle lower portion thereof, and configured to supply electric power from the power supply device to the vehicle upper portion;
   a power distributor electrically coupled to the power line;
   a first voltage converter electrically coupled to the power line via the power distributor and configured to convert voltage of the electric power that is input from the power line via the power distributor;
   a second voltage converter electrically coupled to the power line via the power distributor and configured to convert voltage of the electric power that is input from the power line via the power distributor;
   a overhead console disposed on the vehicle upper portion and on a front side in an advancing direction of the vehicle, and accommodates the power distributor, the first voltage converter, a first load device, and the second voltage converter;
   a first electric wire arranged in the overhead console and transmitting the electric power converted by the first voltage converter to the first load device; and
   a second electric wire that transmits the electric power converted by the second voltage converter to a second load device that is outside the overhead console and is arranged on a ceiling of the vehicle, the second electric wire being arranged on the ceiling of the vehicle; wherein
   the coupling member is a front pillar disposed on the front side in the advancing direction,
   the power distributor distributes the electric power input from the power line to each of the first voltage converter and the second voltage converter,
   the first voltage converter supplies electric power to the first load device accommodated in the overhead console, and
   the second voltage converter supplies electric power to the second load device that is outside the overhead console and is arranged on the ceiling of the vehicle.

2. The power supply system according to claim 1, wherein the first voltage converter generates an illumination power supply, and
   the second voltage converter generates a key-switch power supply.

3. The power supply system according to claim 1, wherein the electric power converted by the first voltage converter is supplied to the second load device.

4. The power supply system according to claim 2, wherein the electric power converted by the first voltage converter is supplied to the second load device.

* * * * *